Jan. 2, 1951 G. P. DE OLIVEIRA 2,536,426
THERMOINSULATED STOPPER OR COVER FOR
THERMOS BOTTLES AND THE LIKE
Filed May 18, 1949
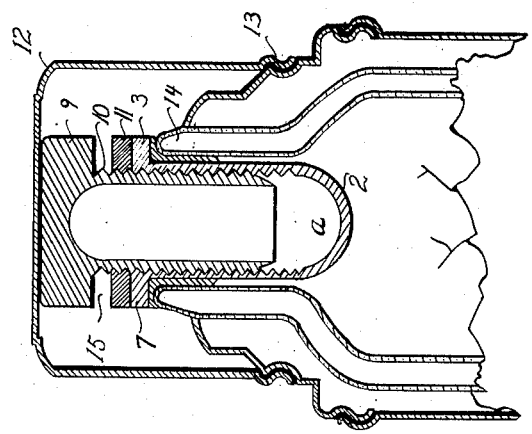
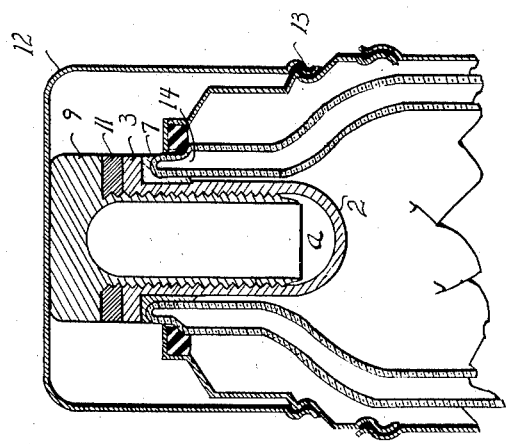
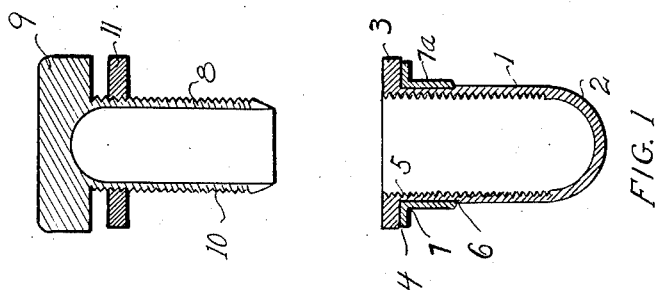
INVENTOR
GERVASIO PINTO DE OLIVEIRA
BY
Richardson, David and Nordon
ATTORNEYS Patented Jan. 2, 1951

2,536,426

UNITED STATES PATENT OFFICE 2,536,426

THERMOINSULATED STOPPER OR COVER FOR THERMOS BOTTLES AND THE LIKE

Gervasio Pinto de Oliveira, Rio de Janeiro, Brazil

Application May 18, 1949, Serial No. 93,918
In Brazil March 14, 1949

5 Claims. (Cl. 215—47)

The present invention relates to improvements in thermo-insulating stopper or cover made of non-absorbent material and fitting into the space between the bottom of the cup which tops the thermos or vacuum bottle and the mouth of the latter bottle, whereby the stopper is secured in its closing position by the pressure exerted upon it by the bottom of the said cup when the latter is screwed on or otherwise fixed to the mantle or envelope of the bottle.

It is the principal object of this invention to substitute by the stopper or cover herein described and claimed the stoppers or plugs of cork and like materials as are commonly used in connection with thermos or vacuum bottles or the like and which are apt to become easily impregnated with the various liquid foodstuffs successively filled into such bottles, thus causing a serious inconvenience both as regards the taste and the proper preservation of such foodstuffs.

One advantage of the stopper or cover according to the present invention consists in that it permits a perfect and hygeinic closure of the vacuum bottle or the like.

Another advantage is that the stopper or cover is, by itself, thermo-insulating.

A further advantage of the stopper or cover consists in that it is so constructed that it can be made of non-absorbent material and still fulfils its purpose of a perfect closure of the bottle.

An additional advantage due to its particular construction is that the stopper or cover can be made of materials not subject to the changes or deterioration by which cork stoppers are commonly affected.

Still another advantage of the stopper or cover of this invention is its adjustability on being fitted within the space between the bottom of the cup or other top closure on vacuum bottles or the like, and the mouth of the bottle, by which adjustment the bottom of the cup or top closure will always firmly press the stopper or cover into the mouth of the bottle and maintain it in such position, thus providing a tighter and safer closing of the bottle.

Finally, the particular construction of the stopper or cover of this invention has the advantage of its being easily mounted and dismounted, cleaned and sterilized.

The invention will now be described in detail by way of example, with reference to the accompanying drawings in which Figure 1 illustrates in longitudinal section and separated from each other the two parts of which the stopper is composed;

Figure 2 shows, also in longitudinal section, the same stopper properly assembled and fitted into the mouth of a vacuum bottle with an inverted cup fixed on the bottle topping the whole;

Figure 3 shows the same arrangement of Fig. 2, the stopper being adjusted to adapt itself to the greater distance from the bottom of the topping cup to the mouth of a different bottle and cup.

As can be seen in the drawings, the invention essentially consists of an external part 1 of the stopper (Fig. 1) adapted to close the bottle which part is formed by an elongated cylindrical hollow body closed at one end 2 and fitting into the mouth of the bottle in the manner of a cork or stopper, the opposite end being open and provided with a salient edge forming a flange 3 the undersurface 4 of which adapts itself to the mouth of the vacuum bottle. The inside of this hollow body from the open end downward short of the closed end is provided with a screw thread 5 engageable by the corresponding screw thread 10 of the other internal and adjustable part 8 of the stopper. The said external hollow body is further provided on its outside adjacent the flange 3 with a shoulder or recess 6 which receives a suitable sealing means consisting of a cylindrical hollow body with a projecting upper flange 7 coming between the flange 4 of the stopper and the mouth of the bottle, the part 7a of the said sealing means being fitted under pressure into the recess 6.

The internal adjustable part 8, already mentioned, of the stopper according to the invention (Fig. 1) is also formed by an elongated, cylindrical hollow body the closed end 9 of which is bulkier than the rest of the hollow body and contacts the bottom of the inverted cup topping the bottle. The external surface of the hollow body 8 from the closed end portion 9 downward is provided with a screw thread 10 whereby its open end portion engages the screw thread inside the open end portion of the external hollow body 1. Thus, these two bodies 1 and 8, on being assembled, form a stopper which can be adjusted as to its length by screwing them together in a higher or lower degree. The body 8 is provided with a fixing ring 11 engaging the screw 10, and thus permitting the stopper to be set and held at a desired height. Due to the assembly of the hollow bodies in the manner described, an air chamber $a$ (Figs. 2 and 3) is formed which makes the stopper thermo-insulating.

Fig. 2 of the drawing shows the stopper assembled and fitted into the mouth of the vacuum bottle, adapting itself exactly in the space between the mouth 14 of the bottle and the bottom of inverted cup 12 mounted on the bottle. Thus, by placing the cup 12 over the stopper, the latter is kept in position due to the pressure exerted upon it by the bottom of the cup screwed or otherwise secured to the mantle or protecting envelope 13 of the vacuum bottle and, in consequence, the stopper will engage the mouth of the bottle by means of the sealing flange 7 and ring 7a. The thermo-insulating air chamber formed within the hollow stopper in indicated by reference letter a.

Figure 3 shows the same stopper described with reference to Fig. 2 adapted to a different vacuum bottle where it is adjusted to the larger space existing between the cup bottom 12 and the bottle mouth 14. From the adjustment results a free space 15 which may be filled, if desired, by one or more washers of suitable material, there also being formed in this case, the thermo-insulating air chamber a.

I claim:

1. An insulating stopper for thermos bottles and the like comprising upper and lower relatively movable members and means between said members for locking them against relative movement, each member having a hollow tubular body open at one end, the lower member being open at its upper end and being flanged at said end to seat on the mouth of the bottle when said member is inserted into said bottle; the upper member being open at its lower end and capped at its upper end, said tubular bodies having cooperating threaded portions, said portions being screwed telescopically one into the other, said locking means locking said bodies in any predetermined lengthwise relation with respect to one another whereby said cap may be spaced any predetermined distance from the mouth of the bottle.

2. An insulating stopper according to claim 1, in which the open ends of the tubular bodies face in opposite directions and form an insulating chamber of variable length when screwed together.

3. An insulating stopper according to claim 1, in which said locking means comprises a nut movable on the screw of one of said bodies to frictionally engage the other body to lock said parts against relative movement.

4. A closure for vacuum bottles and the like of the type having inner and outer containers, the outer container having a cup closure, the inner container comprising a bottle having a stopper positioned below said cup, said stopper comprising upper and lower relatively movable members, and means between said members for locking them against relative movement, the lower member having a body extending into the bottle and being flanged at its upper end to seat on the mouth of said bottle; the upper member extending into said lower member and having a cap at its upper end, said members having cooperating threaded portions, said portions being screwed telescopically one into the other, said cap being longitudinally adjustable with respect to the lower member so as to raise said cap into contact with said cup closure; said locking means being adapted to lock said upper and lower members in such adjusted position, whereby said cup closure will bear against the cap of the stopper and lock it against displacement with respect to the bottle when the cup closure is fixed to the outer container.

5. An adjustable thermo-insulating stopper assembly of rigid non-absorbent material suitable for use in closing the mouths of thermos bottles and similar receptacles, which comprises: two independent cooperating elements; one of said independent elements constituting the stopper element proper, and the other of said independent elements constituting an adjustable element capable of being seated in said stopper element in such manner as to regulate the overall length of said stopper assembly; said stopper element proper comprising: a hollow elongated body closed at one end and open at the other, a flange adapted to be seated on the mouth of the thermos bottle to be closed, said flange surrounding the outside periphery of said hollow elongated body at the open end thereof and secured thereto, a sealing element for holding said flange on said hollow elongated body portion, said sealing element being positioned below said flange and surrounding said body, a helical screw-thread formed on the interior or said hollow elongated body and extending from adjacent said open end thereof to a point adjacent said closed end of said hollow body; and said independent cooperating adjustable element comprising a hollow tubular body open at one end and closed at the other, said tubular body being of such size as to permit its insertion within said hollow portion of said stopper element proper, said hollow tubular body being provided with a shaped head portion at the closed end thereof, a helical screw-thread formed on the outside shank of said hollow tubular body, said screw-thread being adapted to engage said helical screw-thread on the interior of said stopper element proper, and a washer screw-threadedly engaged on said screw-thread on said shank, said washer being adapted, when said adjustable element is positioned within the hollow portion of said stopper element proper to provide the complete stopper assembly, to bear against said flange on said stopper element proper, thus regulating the length of said stopper assembly from said head on said adjustable element to the closed end portion of said stopper element proper, and said washer being adapted for displacement along said shank by rotatory movement thereof, thus permitting adjustment of the length of said stopper assembly and fixation of said washer at the desired position along said shank to provide a stopper assembly of any desired overall length.

GERVASIO PINTO DE OLIVEIRA.

REFERENCES CITED

The following references are of record in the file of this patent:

UNITED STATES PATENTS

| Number | Name | Date |
| --- | --- | --- |
| 1,918,307 | Webber | July 18, 1933 |
| 1,918,308 | Webber | July 18, 1933 |
| 2,106,122 | McGowan | Jan. 18, 1938 |
| 2,176,012 | Payson et al. | Oct. 10, 1939 |
| 2,364,126 | Cantor et al. | Dec. 5, 1944 |